Nov. 3, 1964   A. J. KIRKHAM   3,155,318
ACCESSORY HEATING SYSTEM FOR TRACTORS AND SIMILAR EQUIPMENT
Filed Jan. 11, 1963
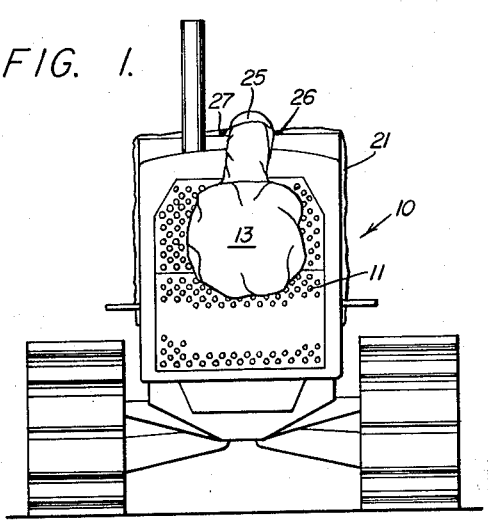
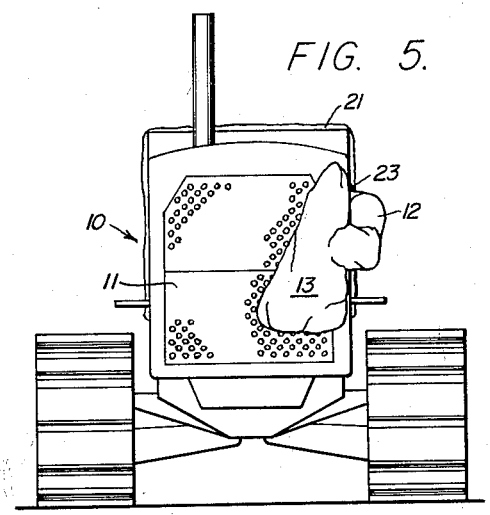
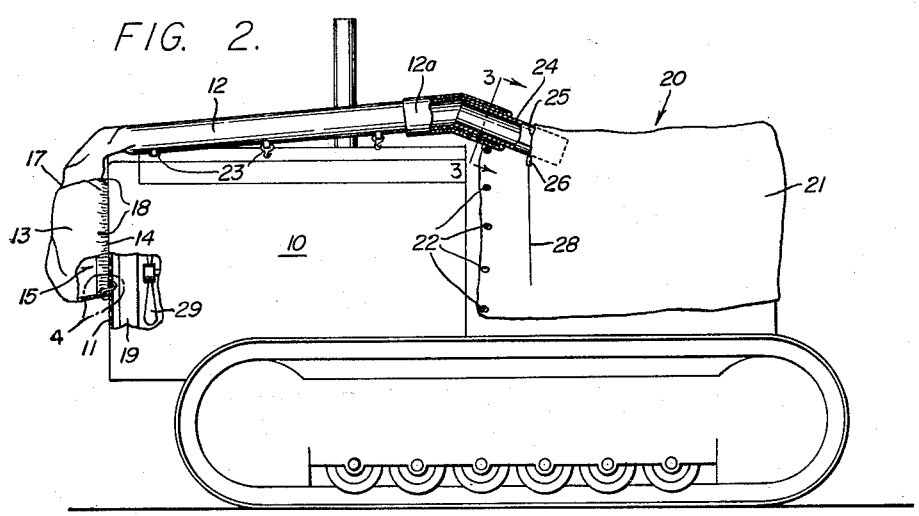
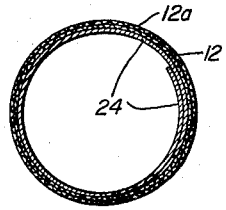
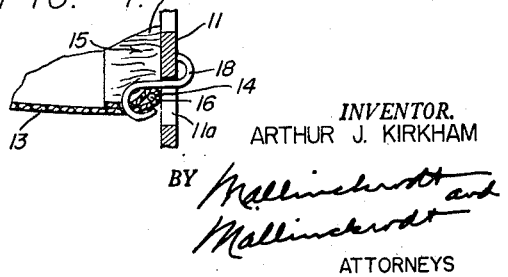
INVENTOR.
ARTHUR J. KIRKHAM
BY
ATTORNEYS

United States Patent Office 3,155,318
Patented Nov. 3, 1964

3,155,318
ACCESSORY HEATING SYSTEM FOR TRACTORS
AND SIMILAR EQUIPMENT
Arthur J. Kirkham, 24 W. 5th South,
Salt Lake City, Utah
Filed Jan. 11, 1963, Ser. No. 250,877
7 Claims. (Cl. 237—12.3)

This invention relates to systems for heating the drivers' compartments of tractors and similar vehicular and stationary equipment in which there is normally no protective enclosure for the driver or operator, or, if there is, it is normally unheated.

Tractors, bulldozers, loaders, and the like are currently being produced with the fan for circulating air through the radiator of the engine cooling system arranged to operate in reverse to what has long been customary for automotive vehicles; that is to say, the fan draws air in from behind and propels it forwardly through and out of the front of the radiator. This has made it impossible to use ordinary canvas flaps to conduct the heat back to the driver's compartment, as in the past.

An important feature of the invention, in the attaining of the primary objective of heating the driver's or operator's compartment under the circumstances, is the provision of a flexible and preferably collapsible duct having a flexible and preferably expansible cap formed at its intake end for attachment over a selected portion of the front of the radiator structure as an intake header for heated air emerging forwardly from the radiator.

Another feature is the provision of preferably a diametrically expanding, resilient tube for snugly fitting into the outlet end of the flexible duct and holding it open while interconnecting it with a flexible enclosure for the operator's compartment. This also permits a duct of maximum length to be shortened, as may be required to fit shorter equipment, by merely folding the outlet end back as a cuff.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

In the drawing:

FIG. 1 is a view in front elevation of a heavy duty tractor as used in the construction industries, with the accessory heating system of the invention temporarily installed to supply heat for the operator in cold weather;

FIG. 2, a side elevation, with portions of the radiator grill and of the duct system shown in vertical section;

FIG. 3, a transverse vertical section taken on the line 3—3 of FIG. 2 and drawn to a larger scale;

FIG. 4, that portion of FIG. 2 which is encircled by the broken line 4, drawn to a considerably larger scale; and FIG. 5, a view corresponding to that of FIG. 1, but illustrating a different, selective placement of the intake header cap over the radiator grill.

Referring to the drawing:

The crawler tractor 10 is shown as merely one example of a variety of work vehicles and internal-combustion-engine-powered equipment to which the temporary, accessory, heating system of the invention is applicable for cold weather work. In most instances, the same system is interchangeable with respect to many different pieces of equipment by reason of its unique structural characteristics.

As illustrated in FIGS. 1 and 2, the system is installed in one way. In FIG. 4, it is installed in a different way, so as to leave a different area of the radiator grill 11 free to accommodate portions of a particular implement attachment (not shown) at the front of the tractor. This exemplifies the versatility of the system.

In the specific form shown, the system comprises a flexible duct 12, which is preferably made of some limp sheet material, such as canvas, so as to be flat and foldable for storage when not in use. At the intake end of duct 12 is formed, preferably from the same type of material, a flexible cap 13, having a rim 14 defining an intake opening 15.

Cap 13 provides, in effect, an intake header. Its rim is advantageously elasticized, as by hemming in an elastic cord 16, FIG. 4, and the cap material is shirred around the rim, so as to permit considerable expansion or deformation of the intake opening 15 when more heat is desired or when required to cover specified areas of the radiator grill 11. In the form shown, the top of the cap is closed and communication with the duct 12 is laterally of the cap, through the side wall thereof where it is joined to the duct proper at 17.

A series of fasteners, for example, the hooks 18, FIGS. 2 and 4, are provided for temporarily securing cap 13 to the radiator structure of the equipment in some selected placement covering a portion of the air passages therethrough. They are advantageously tightly cinched over and secured to rim 14, so as to be permanently carried thereby. As illustrated, the hooks 18 are inserted through openings or air passages 11a of grill 11, which is located immediately in front of radiator 19, and are engaged with or against the back of such grill.

The driver's or operator's compartment 20 of the tractor is provided with any suitable type of enclosure, advantageously a temporary canvas structure 21 having its top open to receive the operator's body and being secured in place by a series of fasteners, such as the mating post and grommet arrangement indicated at 22, FIG. 2.

Duct 12 leads back to the enclosure, conveniently along the outside of the equipment and either over the top of the hood, FIGS. 1 and 2, or along one of the sides, as in FIG. 5. It is preferably equipped with some suitable kind of fasteners along its length, here shown as a series of hooks 23, for hanging it on the equipment when necessary, as in FIG. 5, or on a wire (not shown) strung along the side of such equipment. It connects to the enclosure in any suitable manner, but preferably as shown in FIG. 2.

One end of a length of relatively rigid tubing 24 is inserted in the outlet end of duct 12 and the other end through a zippered slit opening 25, FIGS. 1 and 2, provided between opposing zipper slides 26 and 27 in the flexible sheet material of enclosure 21. By having an elongate, zippered, slit opening, see 28, FIG. 2, closable to selected extents by opposing zipper slides, it is possible to locate a relatively short receiving slit, of any desired length and location along the length of the elongate slit, for the other end of tube 24.

Tube 24 is advantageously made by rolling up a length of sheet metal, having a fair degree of resiliency, with ends overlapped, see FIG. 3, so that the tendency to unroll will expand the tube, and hold both the outlet end of duct 12 and the inlet slit of enclosure 21 open, and will make a reasonably snug and tight fit.

Duct 12 is preferably made of maximum length contemplated for any equipment with which the system will be used. If less than the entire length is required, it is only necessary to fold the outlet end of the duct back as a cuff, see 12a, FIGS. 2 and 3.

When the engine of the equipment is operating, air from forward-discharge fan 29 is expelled through the openings of radiator 19 and grill 11 into cap 13, from where it is conducted into and through duct 12 and tube 24 for final discharge into enclosure 21 to warm the operator seated therein.

Whereas there is here illustrated and specifically described a certain preferred construction which is presently regarded as the best mode of carrying out the invention, it should be understood that various changes may be made and other construction adopted without departing from the inventive subject matter particularly pointed out and claimed herebelow.

I claim:

1. A temporary, accessory, heat-conducting device adapted to transfer heat from a radiator of a tractor or similar equipment, which has a fan arranged to propel air forwardly through and out the front of the radiator to an operator's compartment, and for retaining transferred heat in the compartment, said device comprising: a radiator-engagement cap, said cap being formed of flexible and of resilient material and having an intake opening surrounded by a rim capable of resiliently expanding to cover a selected area of desired configuration; fasteners spaced around said rim in order to hold it tightly against a surface area; and a flexible duct extending from said flexible cap to a point of heat utilization.

2. The heat-conducting device of claim 1, wherein the cap communicates with the duct laterally of said cap.

3. The heat-conducting device of claim 1, wherein the flexible cap and duct are made of limp sheet material and said fasteners are hooks.

4. The heat-conducting device of claim 1, including support fasteners spaced along said duct.

5. A temporary, accessory, heating system for transferring heat from a radiator of a tractor or similar equipment, which has an operator's compartment and a fan arranged to propel air forwardly through and out the front of the radiator to the operator's compartment, and for retaining transferred heat in the compartment, said system comprising: a flexible, radiator-engagement cap having a flexible duct extending therefrom; a flexible, operator's compartment enclosure; and a rolled connecting tube of relatively stiff sheet material adapted to interconnect said duct and the operator's compartment enclosure and to be tightly held in said duct and in an opening in said enclosure by the tendency of the tube to unroll, whereby the end of said duct connecting with said tube can be turned back as a cuff on said rolled tube to adapt said system for use on equipment of varying lengths.

6. The heating system of claim 5, wherein the opening in the operator's compartment enclosure is a zippered slit extending in a direction substantially normal to the axis of the rolled tube, said slit being longer than the outer diameter of said tube and having independent zipper slides at respectively opposite ends thereof for receiving and enclosing the rolled tube at any point along the length of the slit.

7. The heating system of claim 5, wherein the radiator-engagement cap is formed of flexible material and has an intake opening surrounded by a deformable rim capable of expanding to cover a selected area of desired configuration; and fasteners spaced around said rim in order to hold it tightly against a surface area.

References Cited in the file of this patent

UNITED STATES PATENTS

| | | |
|---|---|---|
| 1,862,114 | Gilly | June 7, 1932 |
| 1,988,975 | Weiland | Jan. 22, 1935 |
| 2,047,708 | Rennekamp | July 14, 1936 |
| 2,920,829 | Shane | Jan. 12, 1960 |